(12) United States Patent
Kakutani

(10) Patent No.: US 7,548,353 B2
(45) Date of Patent: Jun. 16, 2009

(54) IMAGE READING APPARATUS AND IMAGE READING METHOD

(75) Inventor: Masaki Kakutani, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 967 days.

(21) Appl. No.: 10/963,878

(22) Filed: Oct. 12, 2004

(65) Prior Publication Data

US 2006/0001923 A1    Jan. 5, 2006

(30) Foreign Application Priority Data

Jul. 2, 2004   (JP) .............................. 2004-196675

(51) Int. Cl.
   *H04N 1/04* (2006.01)
   *H04N 1/46* (2006.01)
(52) U.S. Cl. .................. 358/487; 358/486; 358/488; 358/506
(58) Field of Classification Search ............ 358/487, 358/486, 488, 506
   See application file for complete search history.

(56) References Cited

U.S. PATENT DOCUMENTS

| | | | | |
|---|---|---|---|---|
| 6,453,080 | B1 * | 9/2002 | Kao | ........................... 382/312 |
| 2004/0240001 | A1 * | 12/2004 | Tehrani et al. | ............... 358/488 |

FOREIGN PATENT DOCUMENTS

| JP | 02-019066 A | 1/1990 |
|---|---|---|
| JP | 04-346564 A | 12/1992 |
| JP | 05-207239 A | 8/1993 |
| JP | 06-266024 A | 9/1994 |
| JP | 08-069215 A | 3/1996 |
| JP | 08-317192 A | 11/1996 |
| JP | 2001-148765 A | 5/2001 |
| JP | 2003-037714 A | 2/2003 |
| JP | 2003-255477 A | 9/2003 |
| JP | 2004-037774 A | 2/2004 |

OTHER PUBLICATIONS

Japanese Office Action dated Nov. 2, 2006 and English translation of the "reasons of rejection" poriton thereof issued in a counterpart Japanese Application.

* cited by examiner

*Primary Examiner*—Houshang Safaipour
(74) *Attorney, Agent, or Firm*—Frishauf, Holtz, Goodman & Chick, P.C.

(57) ABSTRACT

This invention provides an image reading apparatus including a light source unit which has a plurality of light sources in the same direction as the main scanning direction of an original and irradiates the original to read the original, a reader which reads the original on the basis of irradiation by the light source section and outputs reading information, an original region identificator which identifies an original existing region where the original exists, and a lighting control unit which executes lighting control of the light sources corresponding to the original region identified by the original region identificator. An image reading method using the image reading apparatus is also provided.

8 Claims, 14 Drawing Sheets

| SCAN ORIGINAL WIDTH [mm] | ORIGINAL LENGTH SENSOR 1 | ORIGINAL LENGTH SENSOR 2 | ORIGINAL SIZE |
|---|---|---|---|
| 182 | OFF | OFF | B5(PORTRAIT) |
| 257 | OFF | OFF | B5(LANDSCAPE) |
| 279 | OFF | OFF | LTR(PORTRAIT) |
| 297 | OFF | OFF | A4(PORTRAIT) |
| 216 | ON | OFF | LTR(LANDSCAPE) |
| 210 | ON | OFF | A4(LANDSCAPE) |
| 257 | ON | ON | B4 |
| 297 | ON | ON | A3 |

| MAIN \ SUB | 1' | 2' | 3' | 4' |
|---|---|---|---|---|
| 1 | — | B5 LANDSCAPE | — | — |
| 2 | B5 PORTRAIT | — | A4 LANDSCAPE | — |
| 3 | — | A4 PORTRAIT | B4 | — |
| 4 | — | — | — | A4 |

IMAGE READING APPARATUS AND IMAGE READING METHOD

FIELD OF THE INVENTION

The present invention relates to an image reading apparatus and image reading method, which move a one-dimensional reading sensor with respect to a reading target such as an original to read a two-dimensional image.

BACKGROUND OF THE INVENTION

An image reading apparatus used as, e.g., the scanner unit of a digital copying machine reads an original image by irradiating an original to be read with light from a light source and receiving the reflected light by a reading sensor. As the reading sensor, a line sensor which reads the image of one line in the main scanning direction is used. The reading operation for each line is repeatedly executed while relatively moving the reading region and original in the sub-scanning direction perpendicular to the main scanning direction, thereby reading a two-dimensional image.

As the light source, a fluorescent lamp long in the main scanning direction is used. The light source is relatively moved with respect to the original together with the reading region of the reading sensor.

To read an original set on the original table, it is only necessary to irradiate a region corresponding to the original existing region with the light source. There is proposed an image reading apparatus which detects the dimension in the sub-scanning direction of an original set on the original table and changes the range in which the light source unit is relatively moved in the sub-scanning direction in accordance with the dimension in this direction (e.g., Japanese Unexamined Patent Publication No. 2003-37714).

In this technique, the sub-scanning irradiation range is adjusted in accordance with the original dimension in the sub-scanning direction. However, the region in the main scanning direction is always irradiated with light throughout the length of the light source. For this reason, if an original whose dimension in the main scanning direction is shorter than the light source is set on the original table and read while keeping the platen cover open, light that irradiates the original non-existing region dazzles the eyes. In addition, even an unnecessary region is irradiated with light, and the energy is wasted.

This application is based upon and claims priority under 35 U.S.C. 119 from the Japanese Patent Application No. 2004-196675 filed in Jul. 2, 2004, at least entire content of which are incorporated herein by reference.

SUMMARY OF THE INVENTION

The present invention has been made to solve the above problems, and has as its first object to provide an image reading apparatus which does not irradiate a region that requires no reading with light even in the main scanning direction of an original.

It is the second object of the present invention to provide an image reading method using the image reading apparatus.

In order to achieve the first object, according to the first aspect of the present invention, there is provided an image reading apparatus comprising a light source unit which has a plurality of light sources in the same direction as a main scanning direction of an original and irradiates the original to read the original, a reading unit which reads the original on the basis of irradiation by the light source unit and outputs reading information, an original region identification unit which identifies an original existing region where the original exists and an original non-existing region where the original does not exist, and a lighting control unit which executes lighting control of the light sources corresponding to the original existing region identified by the original region identification unit.

In the first aspect, lighting control of the light source unit having the plurality of light sources in the same direction as the main scanning direction of the original is executed in accordance with the original region identified by the original region identification unit. As the light source, a white light source having a uniform spectrum in the visible light range is preferably used.

The original region is not limited to a closed region having a closed contour. The original region may be distributed to two or more closed regions like when two originals separated somewhat are set simultaneously on the original table. In this case, the irradiation region of the light sources is preferably set separately in two or more regions.

Relative movement of the reading unit and the original can be done either by a scanning mechanism incorporated in the image reading apparatus or manually as in a handy scanner.

According to the second aspect of the present invention, there is provided an image reading apparatus in which the lighting control unit of the first aspect controls to turn on the light sources corresponding to the original existing region and turn off the light sources corresponding to the original non-existing region.

In the second aspect, lighting control of the light sources is done not to irradiate the original non-existing region with light. The lighting region may coincide with the original region. Alternatively, the lighting region may be slightly larger or smaller than the original region. For example, when predetermined ranges at two ends of an original are set as regions that need not be read, the lighting region may be smaller than the original region.

According to the third aspect of the present invention, there is provided an image reading apparatus of the second aspect, which further comprises an original size detection unit which detects an original size of the original, and in which the original region identification unit identifies the original existing and non-existing regions on the basis of the original size detected by the original size detection unit.

In the above invention, when the original region is to be identified from size information, it is presumed that the original is set at a predetermined reference position (e.g., the left corner on the other side of the original table). If the position is undefined, position information is also detected.

According to the fourth aspect of the present invention, there is provided an image reading apparatus in which the original size detection unit of the third aspect detects the original size on the basis of input dimensions of the original in the main scanning and sub-scanning directions.

In the above invention, dimensions of the original in the main scanning and sub-scanning directions are input. The original region is identified on the basis of these lengths.

According to the fifth aspect of the present invention, there is provided an image reading apparatus of the second aspect, which further comprises an original setting table on which the original is placed, a cover member which covers the original setting table, and a determination unit which determines whether the cover member is open, and in which when the determination unit determines that the cover member is open, the lighting control unit controls to respectively turn on and off the light sources corresponding to the original existing and non-existing regions identified by the original region identification unit.

In order to achieve the second object, according to the sixth aspect of the present invention, there is provided an image reading method in an image reading apparatus including a plurality of light sources in the same direction as a main scanning direction of an original to read the original, comprising the steps of designating a reading mode through a display operation unit, detecting an original size, determining the detected original size and identifying an original existing region on the basis of the original size before reading of the original, determining an original width and original length to be read, on the basis of the identified original existing region, determining a lighting width and an exposure length of the light sources in accordance with the original width and the original length, and reading an image in accordance with the determined lighting width and exposure length.

Effects of Invention

According to the image reading apparatus of the present invention, the light source unit having the plurality of light sources in the same direction as the main scanning direction of an original is ON/OFF-controlled in accordance with the original existing and non-existing regions. For this reason, the original can be read without wastefully irradiating the original non-existing region with light even in the main scanning direction. For example, even when an original is placed on the original table and read while keeping the platen cover open, light never leaks outside the original and dazzles the eyes, resulting in easiness on the eyes. In addition, since the light sources in a region that need not be read are turned off, the energy can be saved.

Since the original existing and non-existing regions are identified before the start of reading operation, an appropriate irradiation region can be set from the start of reading operation.

Since the original existing and non-existing regions are repeatedly determined, and lighting control is repeatedly executed during the reading operation on the basis of the reading information, the irradiation region can be changed even in an indefinite-sized original in accordance with its shape.

Since the original existing and non-existing regions are identified during the reading operation, pre-scanning to detect the original size is unnecessary, and the productivity of reading operation increases. In addition, since pre-scanning is unnecessary, the energy can be saved.

Since lighting control in reading the next line is executed on the basis of the original region identified from the reading information of an arbitrary line, the irradiation region can finely be adjusted by processing each line so that light leakage can be reduced.

A region obtained by adding margin regions to both sides of the original region is irradiated with light. When the original region spreads outward, the state of spread can be detected from the image of the margin region. Hence, the irradiation region can follow up the outward spread of the original existing region.

Since white LEDs are used as light sources, the light source size is small, and the reading range can finely be adjusted. In addition, since white light irradiation is used, a color original can be read without any color degradation or variation.

The above and many other features, objects and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIG. 18 is an explanatory view showing an example of the original size table to determine the original size on the basis of the detection state of each sensor shown in FIG. 17.

DETAILED DESCRIPTION OF THE PREFERRED EMBODIMENTS

Preferred embodiments of the present invention will be described below with reference to the accompanying drawings.

Figure 2:
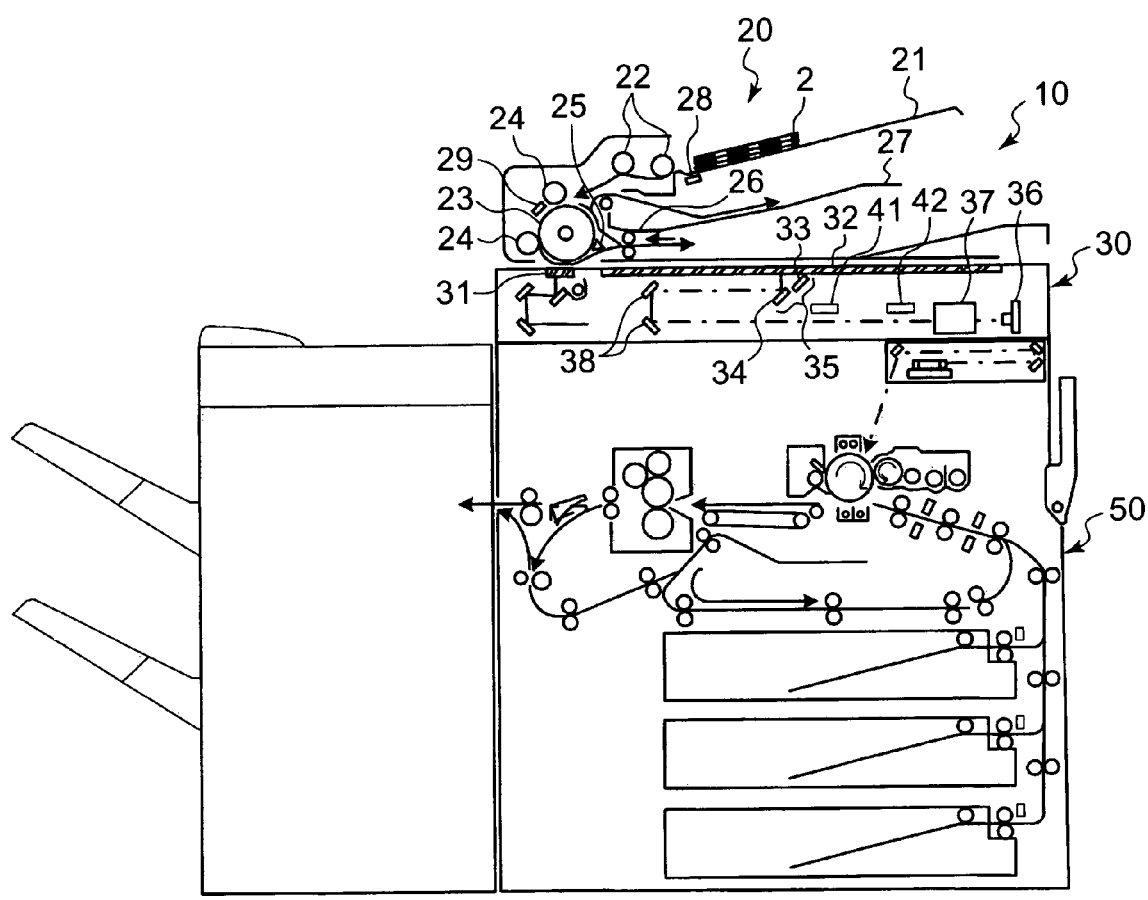
FIG. 2 is a sectional view showing the digital copying machine according to the embodiment of the present invention.

FIG. 2 shows the sectional structure of a digital copying machine 10 including an embodiment of the present invention. The digital copying machine 10 has a scanner function of reading an original image and a copy function of forming a copy image of the read original on a recording paper sheet.

The digital copying machine 10 includes an automatic document feeder 20, a scanner unit 30 serving as an image reading apparatus, and a printer unit 50. The automatic document feeder 20 has a function of feeding originals 2 stacked on an original setting tray 21 to the reading portion of the scanner unit 30 one by one. The automatic document feeder 20 also has a function of reading one surface of a double-sided original, turning it upside down, and feeding it to the scanner unit 30 again.

The automatic document feeder 20 comprises paper feed rollers 22, a contact roller 23, and guide rollers 24. The paper feed rollers 22 feeds originals stacked on the original setting tray 21 sequentially from the top. The contact roller 23 passes an original while keeping it in contact with a contact glass 31, i.e., the original reading portion. The guide rollers 24 guide the original fed by the paper feed rollers 22 along the contact roller 23. The automatic document feeder 20 also comprises a switch gripper 25, reversing rollers 26, and a paper output tray 27. The switch gripper 25 switches the direction in which an original that has passed through the contact glass 31 travels. The reversing rollers 26 turns a double-sided original upside down. A read original is output to the paper output tray 27. The automatic document feeder 20 also comprises an original sensor 28 and an original edge sensor 29. The original sensor 28 detects the size of an original placed on the original setting tray 21. The original edge sensor 29 detects an original which is being conveyed.

The scanner unit 30 has, on its upper surface, the contact glass 31 and a platen original table (platen glass) 32. The contact glass 31 serves as the read portion of an original fed by the automatic document feeder 20. A user manually places an original on the platen original table 32. An exposure scanning unit 35 including a light source unit 33 and a mirror 34 is arranged under the contact glass 31 and platen original table 32.

The light source unit 33 includes an array of a number of light sources (in this embodiment, white LEDs, i.e., white light-emitting diodes) arranged in the main scanning direction (in this embodiment, the main scanning direction is defined as the original width direction) from the front side to the other side of the platen original table 32.

The exposure scanning unit 35 is designed to be moved along the lower surface of the platen original table 32 by a driving unit (not shown) reciprocally in the sub-scanning direction (in this embodiment, the sub-scanning direction is defined as the original length direction) perpendicular to the main scanning direction. The light source unit 33 irradiates an original with light through the contact glass 31 or platen original table 32. The mirror 34 has a function of receiving reflected light from the original and bending the path of the light almost parallel to the platen original table 32.

The scanner unit 30 comprises a line sensor 36, a condenser lens 37, and various kinds of mirrors 38. The line sensor 36 serves as a reading unit which receives reflected light from the original and outputs an electrical signal corresponding to the light intensity. The condenser lens 37 collects the reflected light from the original to the line sensor 36. The mirrors 38 form an optical path to guide the reflected light from the mirror 34 of the exposure scanning unit 35 to the line sensor 36.

The line sensor 36 has a reading region for one line which runs from one end to the other end of the platen original table 32 in the main scanning direction. The line sensor 36 includes a number of, e.g., CCD elements.

A first original length sensor 41 and a second original length sensor 42 to detect the original length (the dimension in the sub-scanning direction) of an original placed on the platen original table 32 are arranged under it at a predetermined interval in the sub-scanning direction. The first original length sensor 41 and second original length sensor 42 are reflection photosensors and have a function of detecting whether an original is present immediately above.

An original placed on the platen original table 32 is read in a stationary scanning mode. When the automatic document feeder 20 is used, originals are read in a flow scanning mode. In the stationary scanning mode, the exposure scanning unit 35 is moved along the lower surface of the platen original table 32 from the left end to the right end (in the sub-scanning direction) to read the two-dimensional image of an original. In the flow scanning mode, the exposure scanning unit 35 is halted immediately under the contact glass 31. In this state, sub-scanning is executed by moving and passing an original above the contact glass 31, thereby reading the two-dimensional image of the original.

A printer unit 50 has a function of forming and outputting an image corresponding to image data on a printing paper sheet by an electrophotographic process. The printer unit 50 is formed as a so-called laser printer which has a printing paper conveyance unit, photosensitive drum, charger, laser unit, developer, transfer separation unit, cleaner, and fuser.

Figure 1:
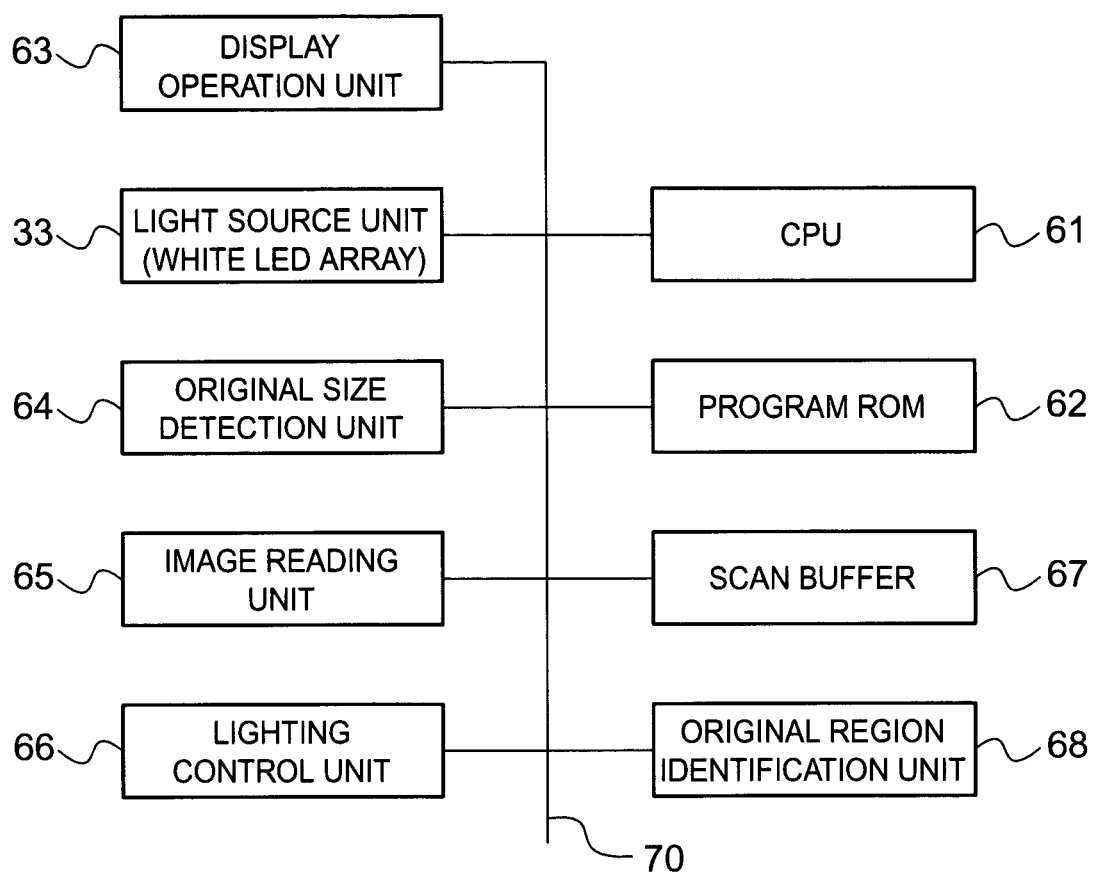
FIG. 1 is a block diagram showing the circuit arrangement of a portion related to the scanner unit of a digital copying machine according to an embodiment of the present invention.

FIG. 1 shows the circuit arrangement of a portion related to the scanner unit 30 of the digital copying machine 10. A CPU (Central Processing Unit) 61 has a function of collectively controlling the operation of the apparatus. The CPU 61 is connected to various kinds of devices through a bus 70 and other signal lines. A program ROM (random access memory) 62 stores the control program to be executed by the CPU 61.

A display operation unit 63 includes a display device such as a liquid crystal display having a touch panel on the surface and various kinds of operation switches. The display operation unit 63 has a function of displaying an operation window in which various kinds of guidance information or operation buttons are displayed or receiving various kinds of operations. For example, the display operation unit 63 receives a reading mode setting operation of designating a standard size or indefinite size as the size of an original to be read or an original size designation operation.

An original size detection unit 64 has a function of detecting whether the size of an original set on the automatic document feeder 20 or an original placed on the platen original table 32 corresponds to one of a plurality of kinds of standard sizes determined in advance.

An image reading unit 65 has a function of reading an original image. Not only the line sensor 36 but also a sub-scanning mechanism (not shown) which moves the exposure scanning unit 35 and the automatic document feeder 20 correspond to the image reading unit 65.

A lighting control unit 66 controls the lighting state of the light source unit 33. The lighting control unit 66 can ON/OFF-control each of the plurality of white LEDs as the plurality of light sources included in the light source unit 33.

A scan buffer 67 is a memory which can store image data of a plurality of lines read by the image reading unit 65. The read image data is sequentially transferred from the scan buffer 67 to a large image memory (not shown) in the digital copying machine 10.

An original region identification unit 68 has a function of identifying at least a main-scanning region in a region where an original exists (existing region or original region). On the basis of the image of each of lines read during the reading operation as well as at the start of reading, the original region identification unit 68 sequentially identifies an original existing region in the line. Image data to be identified is supplied from the scan buffer 67 to the original region identification unit 68.

An operation executed when an original placed on the platen original table 32 is read in the stationary scanning mode will be described next.

Figure 3:
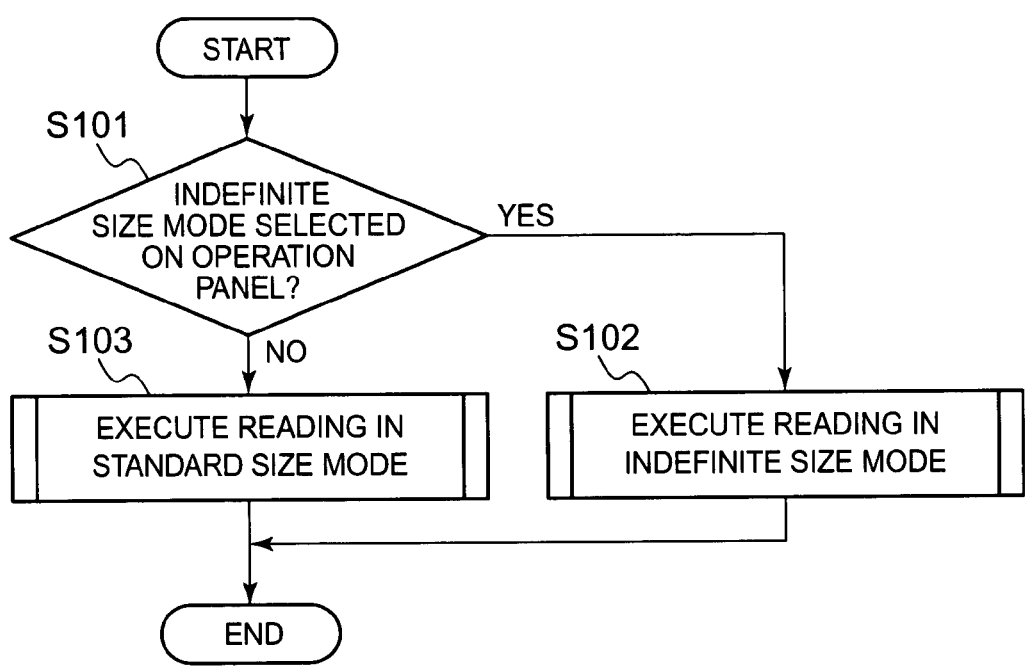
FIG. 3 is a flowchart showing the schematic operation of the digital copying machine according to the embodiment of the present invention when it reads an original placed on the platen original table.

FIG. 3 shows the schematic operation of the digital copying machine 10 when it reads an original placed on the platen original table 32. The user designates, through the display operation unit 63, the standard size mode or indefinite size mode as a reading mode for reading an original placed on the platen original table 32. In the initial state, the standard size mode is set. When the user designates the indefinite size mode (YES in step S101), the reading operation is executed in the indefinite size mode (step S102). If the user designates no reading mode or he/she designates the standard size mode (NO in step S101), the reading operation is executed in the standard size mode (step S103).

Reading in Standard Size Mode:

In the reading operation in the standard size mode, original size detection is done first. Original size detection includes manual setting and automatic detection.

Figure 4:
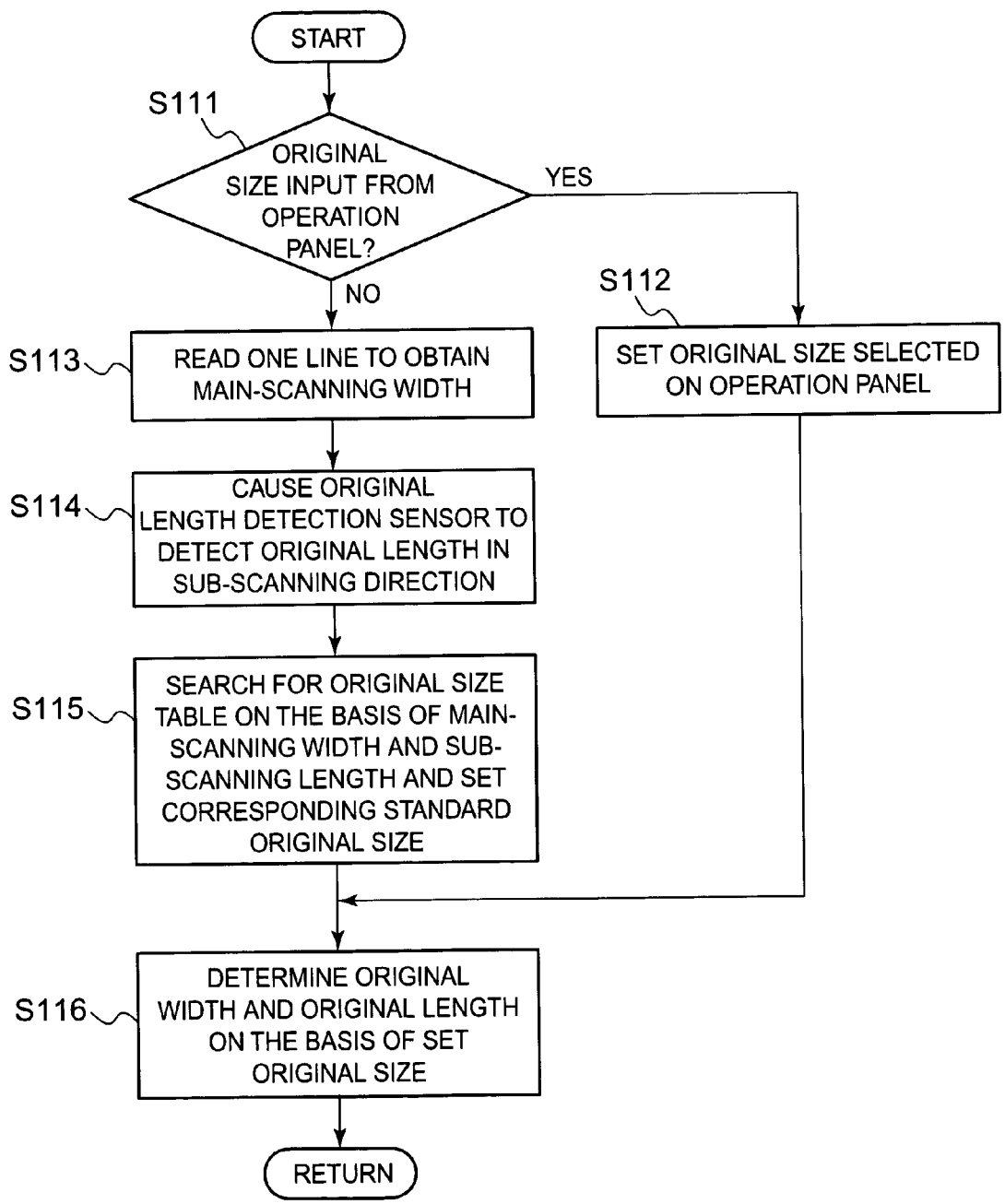
FIG. 4 is a flowchart showing original size detection processing which is executed in reading in a standard size mode by the digital copying machine according to the embodiment of the present invention.

FIG. 4 shows the flow of the original size detection operation executed by the original size detection unit 64. When an original size is input by the user through the display operation unit 63 (YES in step S111), the original size is manually set. The input original size is manually set as the size of the original to be read now (step S112). The original size is input by displaying selection buttons representing the identification names of standard sizes such as B5 (portrait), B5 (landscape), LTR (portrait), LTR (landscape), A4 (portrait), A4 (landscape), B4, and A3 on the operation window of the display operation unit 63 and causing the user to operate one of the selection buttons.

Figure 16:
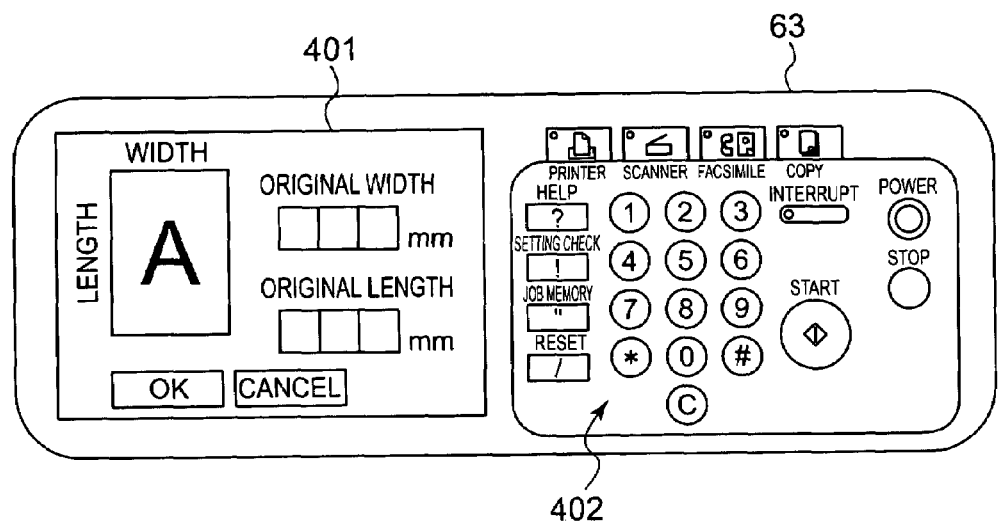
FIG. 16 is an explanatory view showing an example of the display operation unit on which a size input window to input the original width and original length is displayed.

For a rectangular original, the original size need not always be input in the above-described way. Instead, dimensions of the original in the main scanning and sub-scanning directions may be input from the display operation unit 63. For example, a size input window 401 as shown in FIG. 16 may be displayed on the operation panel 63. The values of the original width and original length are received from a ten-key unit 402.

If the original size input operation is not executed (NO in step S111), the original size is automatically detected before the start of original reading operation. To read an original having a standard size, an original 122 is set while aligning a vertex to a reference position 121 at the left corner on the other side of the platen original table 32, as shown in FIG. 5.

Figure 6:
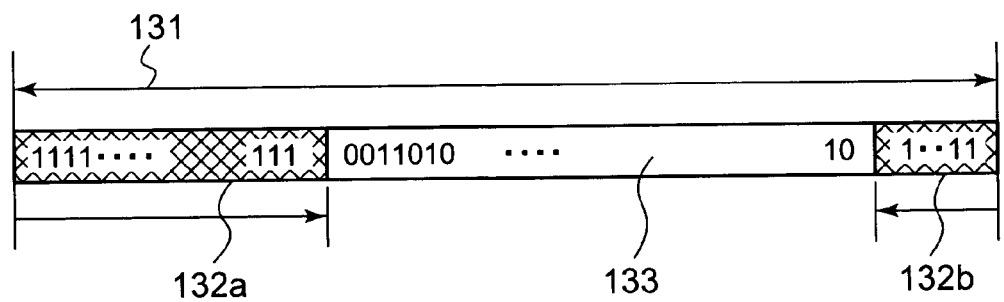
FIG. 6 is an explanatory view showing a state in which the main-scanning original width is identified from image data.

In automatic original size detection, first, a predetermined region and, in this example, one line at the left end of the platen original table 32 is read. The image is analyzed to determine the dimension (original width) of the original in the main scanning direction (step S113). More specifically, (1) the light source unit 33 is wholly turned on. As shown in FIG. 6, image data 131 corresponding to one line in the main scanning direction at the reference position 121, which is read by the line sensor 36, is checked from both sides. (2) Regions where black image data (black pixels) continue inward from the end portions are determined as original non-existing regions 132a and 132b. The remaining portion of the image data 131 of one line in the main scanning direction except the original non-existing regions 132a and 132b is determined as an original existing region 133. The size of the existing region 133 is defined as the original width in the main scanning direction.

Figure 5:
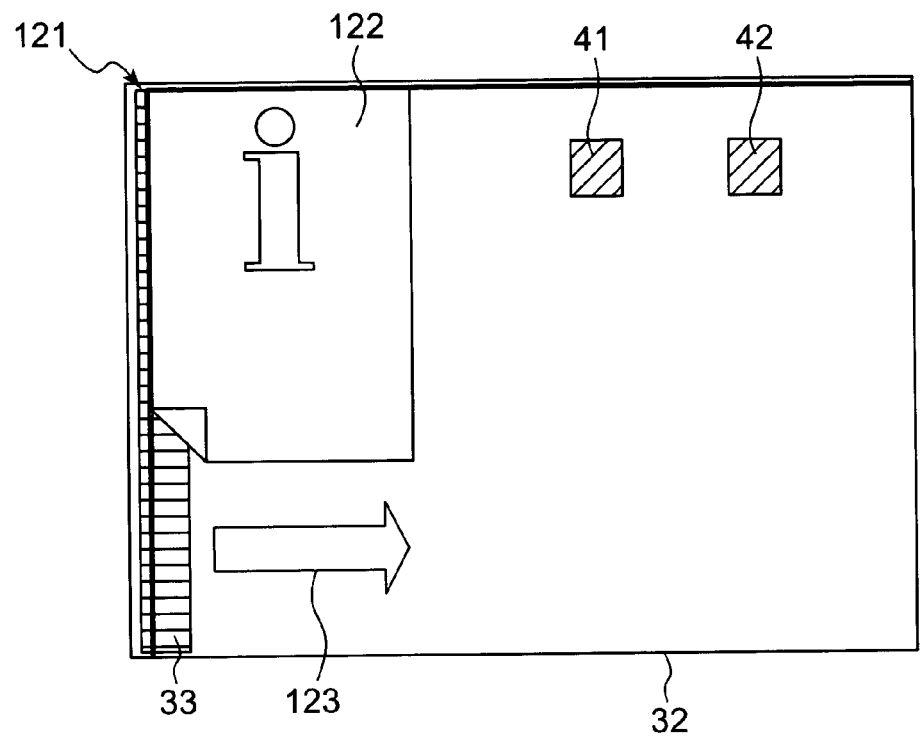
FIG. 5 is an explanatory view showing an example of a state in which an original in a standard size is set at the reference position on the platen original table of the digital copying machine according to the embodiment of the present invention.

In addition, the dimension (original length) in the sub-scanning direction (the direction indicated by an arrow 123 in FIG. 5) is detected by using the first original length sensor 41 and second original length sensor 42 shown in FIG. 5 (step S114). The original length is identified in three ranks: "short" when the first original length sensor 41 is off, "medium" when the first original length sensor 41 is on, and the second original length sensor 42 is off, and "long" when the second original length sensor 42 is on.

Figures 7, 8:
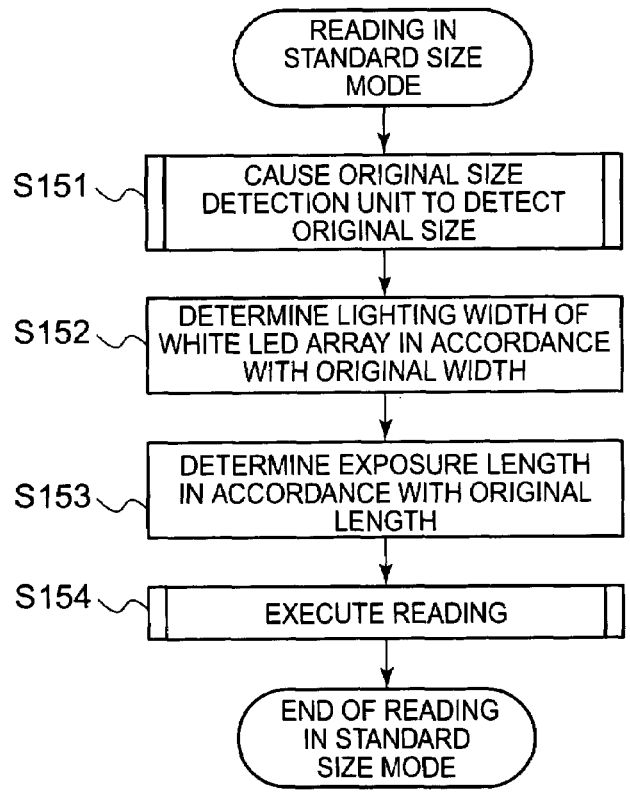
FIG. 7 is an explanatory view showing an example of an original size table.
FIG. 8 is a flowchart showing the operation of the digital copying machine according to the embodiment of the present invention when it reads an original in a standard size mode.

A standard size which is most coincident with the combination of the thus detected original width in the main scanning direction (scan original width) and original length in the sub-scanning direction is found in an original size table 140 shown in FIG. 7. The standard size is determined as the current original size (step S115 in FIG. 4). More specifically, before the start of original reading, the original size is determined on the basis of the original width and original length. On the basis of the original size, the original existing region, i.e., the original region where the original exists and an original non-existing region where no original exists are identified. With this process, the original existing region can be identified without reading the entire original image.

Detailed values or the number of pixels of the original width and original length are determined on the basis of the standard size input by the user operation or the standard size determined by automatic detection (step S116). For example, the original width or original length is represented by the number of pixels, mm, or inch.

FIG. 8 shows the flow of the operation of reading an original in the standard size mode. As described above, the original size is detected by the original size detection unit 64 (step S151). The lighting width of the light source unit 33 (the size of the irradiation region) is determined in accordance with the detected original width (step S152). The exposure length is determined in accordance with the detected original length (step S153). The exposure length is the distance of main-scanning movement of the exposure scanning unit 35 in the reading operation. In this embodiment, the original region is identified on the basis of the original size detected by the original size detection unit 64.

The image reading operation is executed while keeping the light source unit 33 turned on in a lighting width determined in step S152 (step S154). In the reading operation, reading an image of one line in the main scanning direction is repeated while moving the reading position in the sub-scanning direction. The reading operation is started from the left end of the platen original table 32 and ended when the exposure scanning unit 35 moves in the sub-scanning direction by the exposure length determined in advance.

Figure 9:
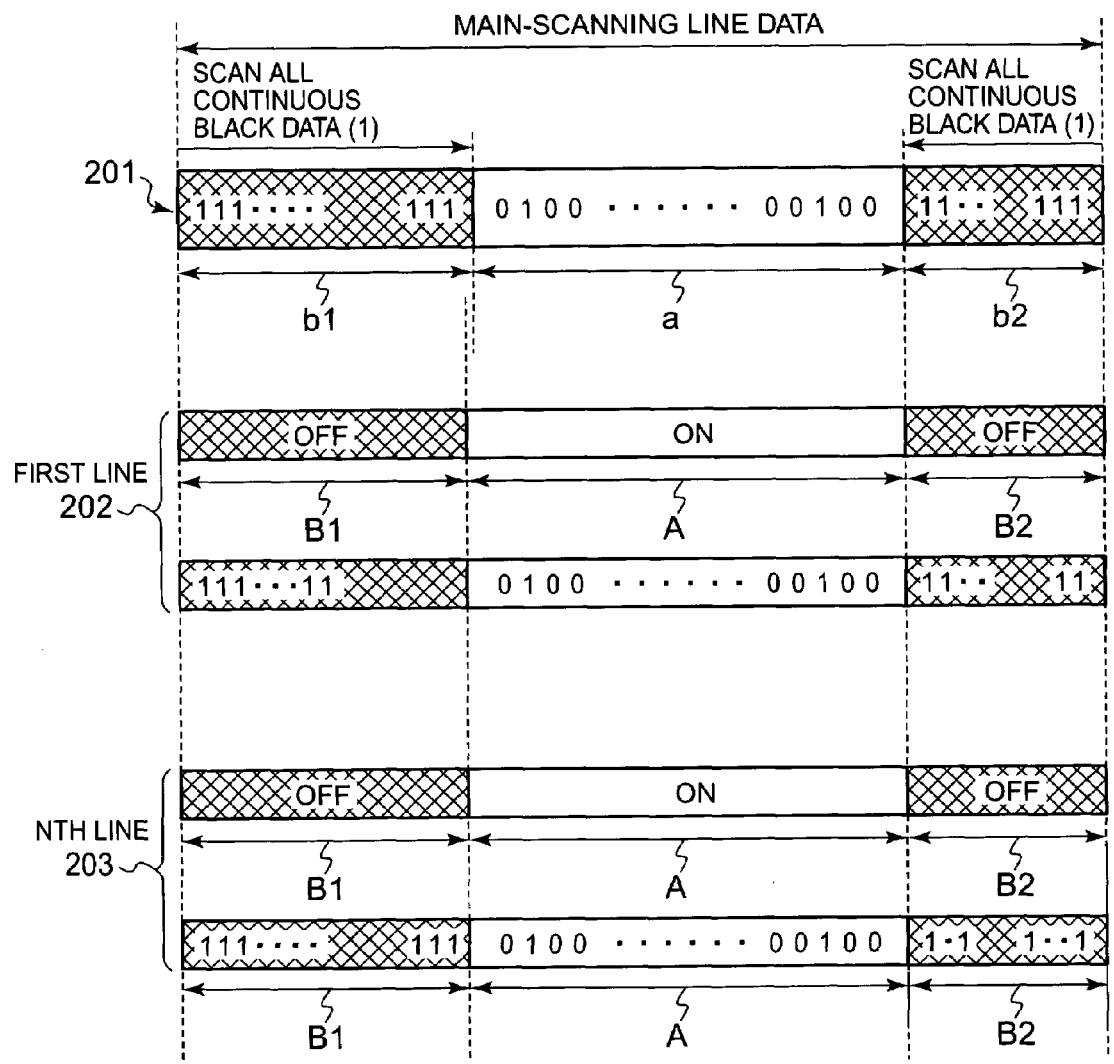
FIG. 9 is an explanatory view showing the relationship between a read image and the lighting width of the light source when an original is read in the standard size mode.

FIG. 9 shows the relationship between a read image and the lighting width of the light source when an original is read in the standard size mode. Image data 201 at the upper portion of FIG. 9 is read when the original size is automatically detected. A portion except original non-existing regions "b1" and "b2" at the two ends in which black pixels continue is identified as an original existing region "a".

An irradiation region "A" in reading image data 202 of the first line is determined from the standard size determined by looking up the original size table 140 on the basis of the size of the existing region "a" and the original length detected in three ranks by the first original length sensor 41 and second original length sensor 42. The irradiation region "A" almost coincides with the existing region "a". Lighting OFF regions "B1" and "B2" where the light source is turned off are present on both sides of the irradiation region "A". The irradiation region "A" and lighting OFF regions "B1" and "B2" are not changed during the reading operation. Even in reading image data 203 of the Nth line, they remain the same as in reading the image data 202 of the first line.

The exposure width per LED element of the LED array included in the light source unit 33 changes depending on the directivity of the lens of each LED and the distance between the LED array and the original. For example, when the exposure width per LED element is 1 mm, the exposure width is adjusted in steps of 1 mm to a value as close as possible to the original width in a direction in which the exposure width should be larger than the original width. When the exposure width per LED element is 2 mm, the exposure width is adjusted in steps of 2 mm to a value as close as possible to the original width in a direction in which the exposure width should be larger than the original width. When lighting control is executed for a plurality of continuous LEDs in blocks, the exposure width is adjusted in blocks to a value close to the original width.

Figure 10:
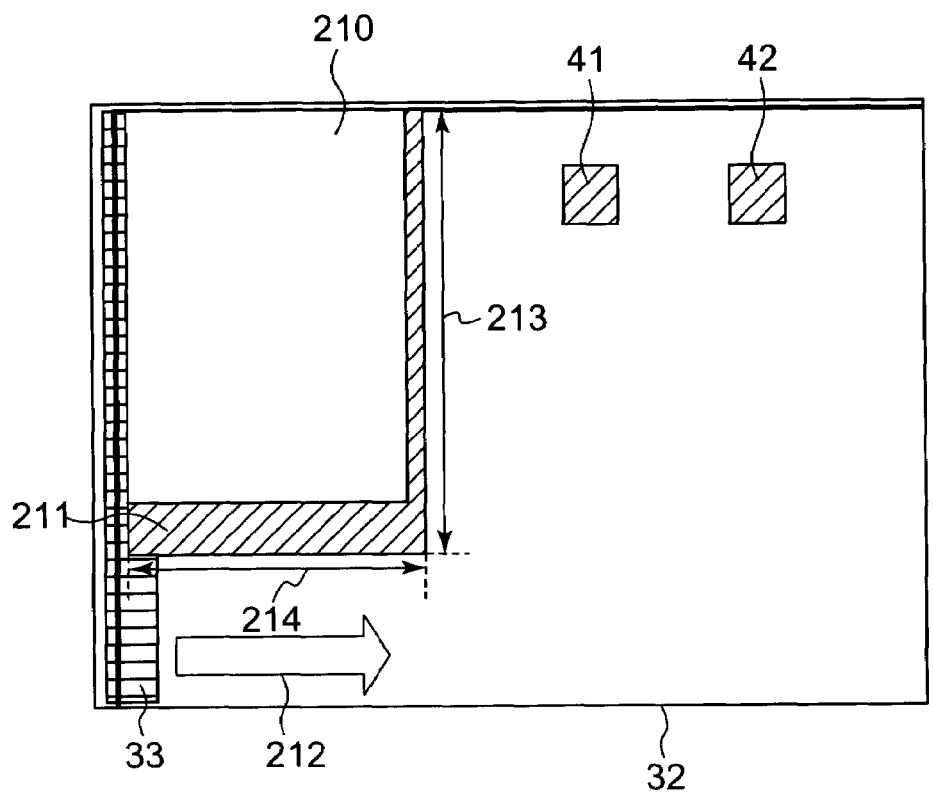
FIG. 10 is an explanatory view showing an example of the relationship between the original region and the lighting ON region in reading in the standard size mode.

FIG. 10 shows an example of a lighting ON region 211 of the light source unit 33 in reading an original in the standard size mode. An arrow 212 in FIG. 10 indicates the moving direction of the light source unit 33 (sub-scanning direction). The lighting ON region 211 is rectangular including the portion behind an original 210. A lighting width 213 of the light source unit 33 is slightly larger than the original width. An exposure length 214 is slightly larger than the original length.

In the embodiment, dimension of the original in the main scanning direction is determined on the basis of image data obtained by irradiation of the light source unit. However, the present invention is not limited to this. A plurality of sensors may be arranged even in the main scanning direction, like the sub-scanning direction, to determine the original size on the basis of the sensor output results in the main scanning direction and sub-scanning direction.

Figure 17:
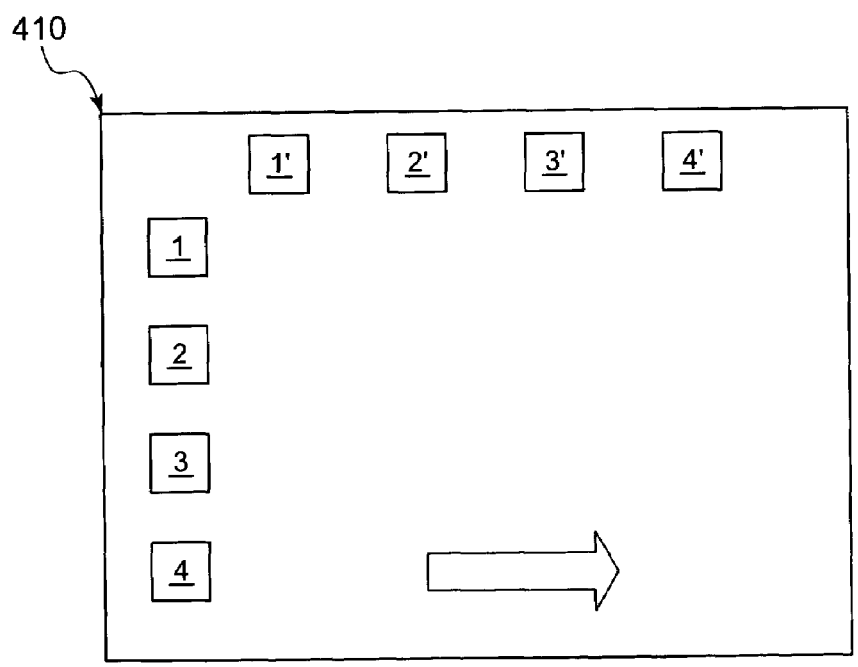
FIG. 17 is an explanatory view showing an example of the original table on which original size detection sensors are arranged in both the main scanning direction and the sub-scanning direction.

For example, as shown in FIG. 17, sensors 1 to 4 are arranged in the main scanning direction. Sensors 1' to 4' are arranged in the sub-scanning direction. An original is set while aligning a vertex to a reference position 410 at the left corner on the other side of the platen original table. An arrow 411 indicates the scan direction. The original size is determined on the basis of the detection states of the sensors 1 to 4 and sensors 1' to 4' and an original size table 420 shown in FIG. 18. The original size table 420 assumes that the sensors are ON. "-" indicates an indefinite size. For example, when the sensor 2' in the sub-scanning direction and the sensor 2 in the main scanning direction are ON (detecting an original), the original size is determined as B5 portrait. When the sensor 2 is ON, the sensor 1 is ON too, as a matter of course.

Reading in Indefinite Size Mode:

Even in the reading operation in the indefinite size mode, pre-scanning of an entire original is not executed, unlike the prior art. Instead, the original existing region in image data in the main scanning direction is identified for each line. A region defined by adding predetermined margin regions to the two ends of the existing region is set to the size (lighting width) of the irradiation region in reading the next line. More specifically, scanning of the next line in the sub-scanning direction is executed while reflecting the identification result of the current line on reading control and lighting control of the light source unit 33. Accordingly, determination of the original existing region, lighting control of the light source unit 33, and reading control are executed almost simultaneously. In this mode, an original having an indefinite size or a skewed original is reliably read.

The image of an arbitrary line to be read next is read on the basis of an original region which is recognized as a preceding image reading result. Hence, the original region of the line of interest is identified before the start of image reading. This indicates that the original region is recognized before the end of reading of the whole original image, unlike conventional pre-scanning in which the original region is determined when reading of the whole original image is ended.

In this embodiment, when the indefinite size mode is selected, each line of the original is read in the sub-scanning direction by the reading unit. The original region identification unit identifies the original region on the basis of reading information about an arbitrary line output from the reading unit. The lighting control unit controls lighting of the light source in reading the next line. These steps are repeatedly executed. However, this control can also be executed even in the standard size mode.

The original region identification unit 68 scans image data of one line in the main scanning direction, which is red by the image reading unit 65, inward from the two ends and recognizes a range with black pixels continuing from the end portions as data outside the original, thereby identifying the original existing region. This identification processing is executed for each line. The lighting control unit 66 sets a range, which is defined by adding predetermined margin regions to the two ends of the existing region identified by the original region identification unit 68, to the lighting width (the size of the irradiation region) in reading the next line and controls the lighting state of the light source unit 33. Such lighting control is executed for each line until the end of the reading operation.

Figure 11:
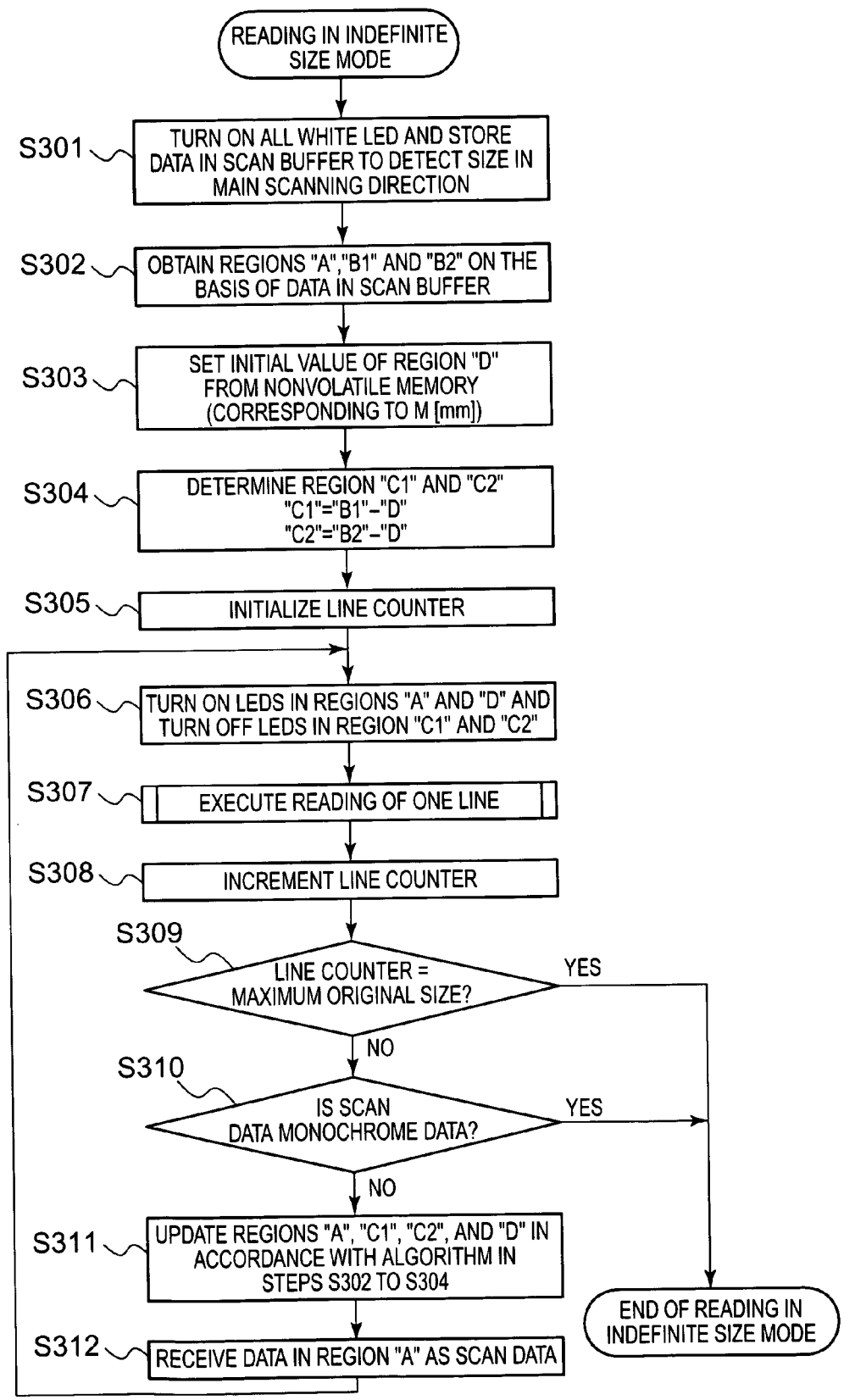
FIG. 11 is a flowchart showing the operation of the digital copying machine according to the embodiment of the present invention when it reads an original in an indefinite size mode.

FIG. 11 shows the flow of the operation of reading an original in the indefinite size mode. To detect the original size in the main scanning direction, the light source unit 33 is turned on wholly from end to end, and image data of one line is stored in the scan buffer 67 (step S301). The original region identification unit 68 identifies the original existing region and the original non-existing region (the region outside the original) on the basis of the image data stored in the scan buffer 67 (step S302).

Figure 12:
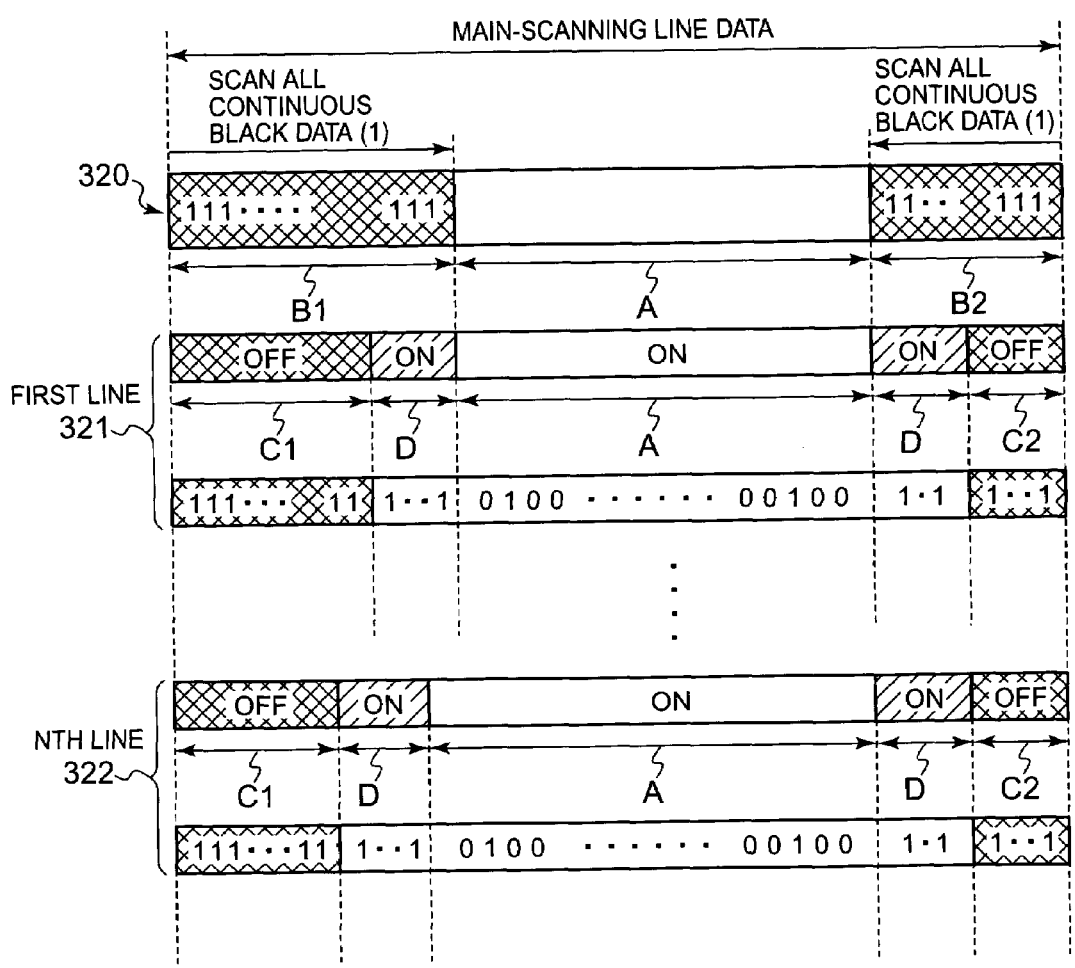
FIG. 12 is an explanatory view showing an example of a state in which the irradiation region of the light source unit changes when an original is read in the indefinite size mode.

More specifically, as shown in FIG. 12, for image data 320 of one line which is read when the light source unit 33 is wholly turned on, it is checked inward from the two ends whether each pixel is a black pixel until the trains of black pixels end. Regions at the two end portions where black pixels continue are identified as original non-existing regions "B1" and "B2". The remaining portion obtained by excluding the original non-existing regions "B1" and "B2" from the image data 320 of one line is identified as an original existing region "A". The range of each region is indicated by the number of pixels.

The lighting control unit 66 reads out a preset margin region size (M mm) from a nonvolatile memory (not shown) and sets it to the initial value of a margin region "D" (step S303). The margin region is set to a length of, e.g., 1 mm to several mm. The lighting control unit 66 subtracts the margin region "D" from each of the original non-existing regions "B1" and "B2" identified by wholly turning on the light source unit 33, thereby determining lighting OFF regions "C1" and "C2" of the light source unit 33 (step S304). The lighting width of the light source unit 33 corresponds to a region (A+2D), i.e., the original existing region "A"+the margin regions "D" on both sides.

After that, the line counter is initialized (step S305). When the pre-reading operation is ended, the actual reading operation starts.

The size of the margin region "D" is registered in the nonvolatile memory as data in millimeters. To subtract the margin region "D" from the original non-existing regions "B1" and "B2" or add the margin region "D" to the original existing region "A", a number N of pixels converted on the basis of the reading resolution is used. For example, when the reading resolution is 600 dpi, the number of pixels per mm is 600/25.4≈24 pixels. Hence, when the margin region size M read out from the nonvolatile memory is set to, e.g., 2 mm, the number N of pixels is "48".

The exposure width per LED element of the LED array included in the light source unit 33 changes depending on the directivity of the lens of each LED and the distance between the LED array and the original. For example, when the exposure width per LED element is 1 mm, and the margin region size M is 2 mm, the range can be irradiated by turning on two extra LED elements. The exposure width per LED element has been described above. Instead of individually turning on the LEDs, lighting control may be executed for each of a plurality of blocks of LEDs. The margin region "D" is a region to detect the edge of the original. Exposure must be executed for a region larger than the original by several mm.

In the reading operation, the following processing is executed for each line. First, of the light source unit 33, LEDs corresponding to the size of the region (A+2D), i.e., the original existing region "A"+the margin regions "D" on both sides are turned on, and LEDs corresponding to the lighting OFF regions "C1" and "C2" are turned off (step S306). In this lighting state, the image of one line is read (step S307). The line counter is incremented by one (+1) (step S308).

When the line counter value has reached a value corresponding to a predetermined maximum original length (YES in step S309), the reading operation is ended at this time. If the line counter value has not reached the value corresponding to the maximum original length yet (NO in step S309), it is checked whether all the pixels of the current line read in step S307 are black pixels. If all pixels are black (YES in step S310), the reading operation is ended at this time. When all pixels are black, it is determined that the reading has been executed to the end of the original.

If not all the pixels of the image of the current read line are black (NO in step S310), the original existing region "A", the margin region "D"×2, and the lighting OFF regions "C1" and "C2" are obtained for the current read line, and these values are updated (step S311) The image data of a portion corresponding to the newly set existing region "A" is received as actually necessary image data to be read (step S312). The flow returns to step S306 to continue the processing of the next line. How to obtain the original existing region "A", margin regions "D", and lighting OFF regions "C1" and "C2" is the same as in steps S302 to S304.

In this way, the original existing region is identified on the basis of the image data of the current line. The lighting width (the size of the irradiation region) of the light source in reading the next line is determined on the basis of the original existing region. Hence, an original having an indefinite size can be irradiated with light efficiently in accordance with its shape.

Image data in the margin region "D" is whole black data if the original width decreases or remains the same. On the other hand, if the original width increases, the image data contains white image data, too.

If one of the end portions of the newly obtained existing region "A" spreads to the entire preceding margin region "D" on the side of that end portion, new margin regions on both sides are spread to the entire original non-existing regions "B1" and "B2". That is, on the two end sides, the LEDs are turned on up to the ends of the line. Accordingly, processing can cope with an abrupt increase in original width.

FIG. 12 shows an example of the states of the first line and Nth line in reading an original in the indefinite size mode. On the basis of the image data 320 of one line read by pre-reading, the irradiation region (A+2D) and lighting OFF regions "C1" and "C2" on both sides in reading a first line 321 are determined. In an Nth line 322, the irradiation region (A+2D) and lighting OFF regions "C1" and "C2" change in accordance with the original width as compared to the first line 321.

Figure 13:
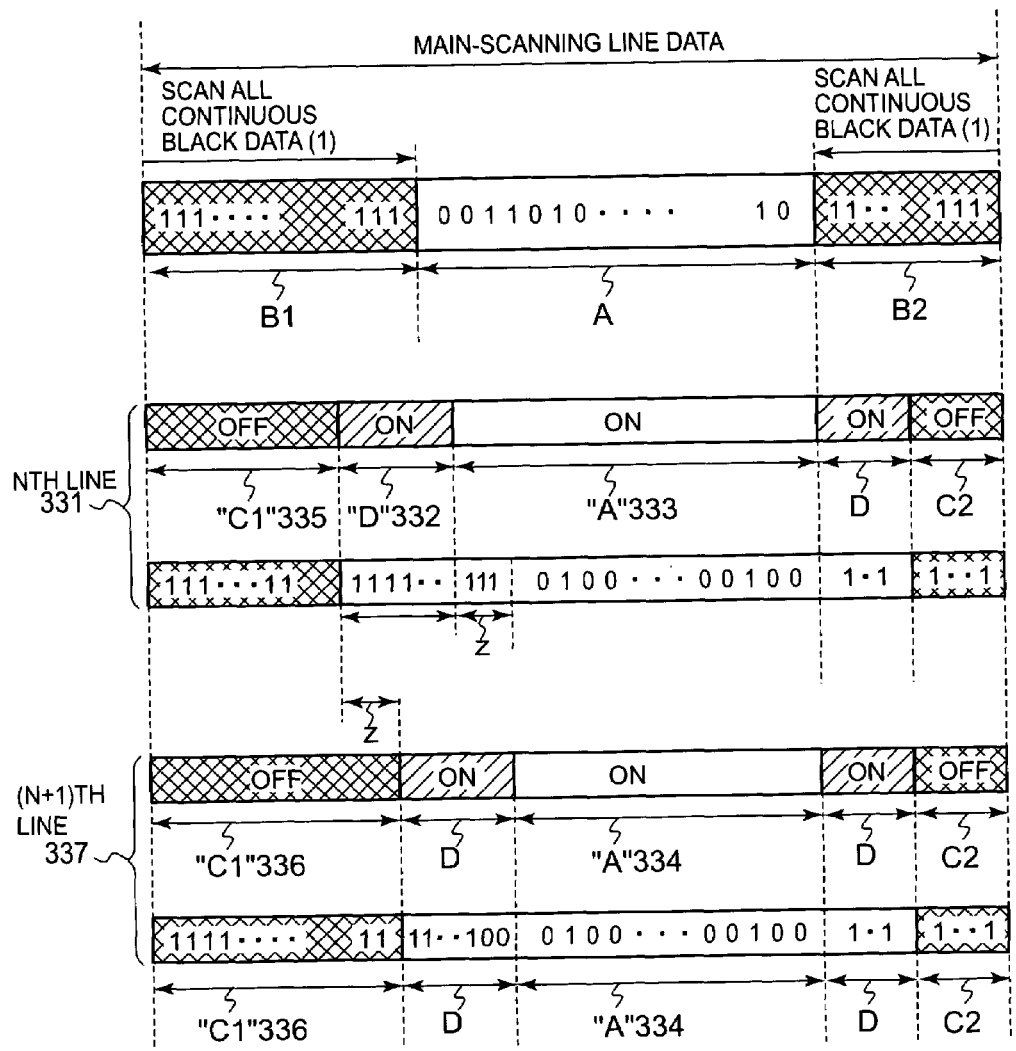
FIG. 13 is an explanatory view showing the change of each region when the original width decreases during reading.

FIG. 13 shows the change of each region when the original width decreases during reading. In an Nth line 331, when all pixels included in the margin regions "D" are black, the new existing region "A" and lighting OFF regions "C1" and "C2" are determined by executing the following processing. The size of the margin region "D" is not changed.

(1) A number "z" of black pixels which continue inward in an existing region "A" 333 adjacent to a margin region "D" 332 in which all pixels are black in the Nth line 331 is counted. The number "z" is subtracted from the current existing region "A" 333 to obtain a new existing region "A" 334. This can be expressed by the number of pixels by Number "$P2$" of pixels in new existing region = number "$P1$" of pixels in preceding existing region − "$z$"

(2) The number "z" is added to the number of pixels in each of current lighting OFF region "C1" 335 to obtain new lighting OFF region "C1" 336. This can be expressed by the number of pixels by Number "$Q2$" of pixels in new lighting OFF region = number "$Q1$" of pixels in preceding lighting OFF region + "$z$"

Referring to FIG. 13, the left end of the irradiation region (A+2D) in reading an (N+1)th line 337 is shifted to the right by "z" pixels as compared to the Nth line 331.

Figure 14:
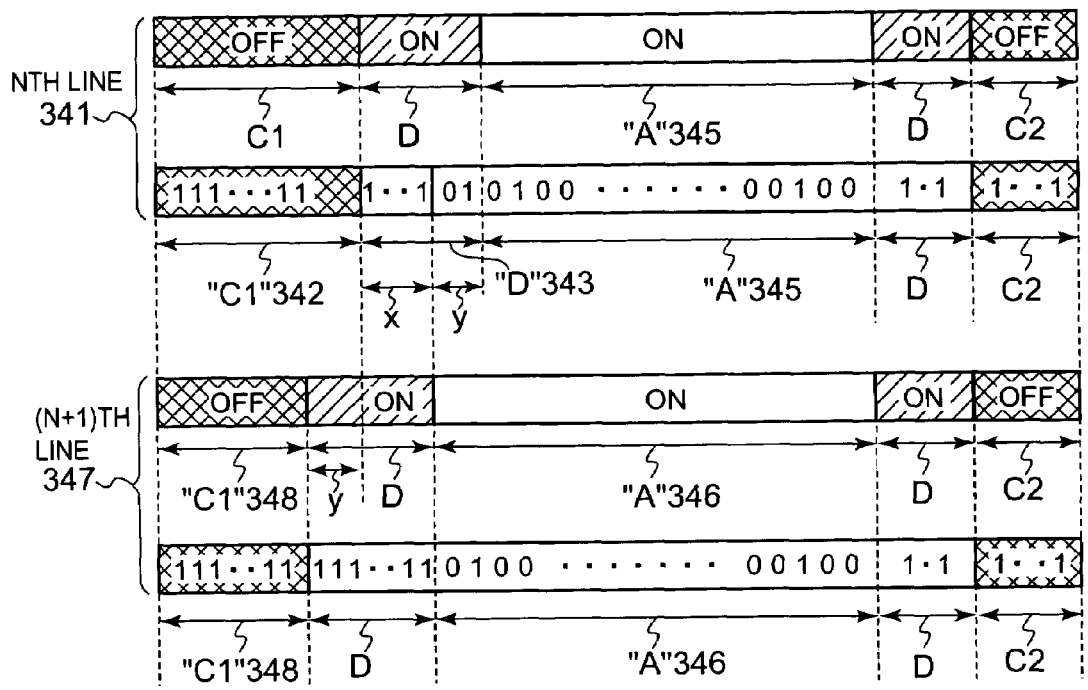
FIG. 14 is an explanatory view showing the change of each region when the original width increases during reading.

FIG. 14 shows the change of each region when the original width increases during reading. When the existing region "A" spreads, white data is mixed with the image data in the margin region "D". In this case, the new existing region "A" and lighting OFF regions "C1" and "C2" are determined by executing the following processing. The size of the margin region "D" is not changed except when the original width abruptly increases.

(1) A number "x" of black pixels which continue inward in margin regions "D" 343 from lighting OFF region "C1" 342 in an Nth line 341 is counted. The number "x" is subtracted from the number of pixels in the margin region "D" 343 to obtain an increased number "y" of pixels in an existing region "A" 345. That is, Number "$R$" of pixels in margin region = number "$x$" of continuous black pixels = increased number "$y$" of pixels (2) The difference "y" is added to the number of pixels in the existing region "A" 345 of the Nth line 341. In addition, the difference "y" is subtracted from the number of pixels of each of the lighting OFF region "C1" 342. That is, Number "P2" of pixels in new existing region = number "P1" of pixels in preceding existing region + "y"

In addition,

Number "Q2" of pixels in new lighting OFF region = number "Q1" of pixels in preceding lighting OFF region − "y"

A new existing region "A" 346 in reading an (N+1)th line 347 becomes large, and new lighting OFF region "C1" 348 become small accordingly. When the increased number "y" of pixels coincides with the number "R" of pixels in the margin region, the new margin region on each end side spreads to the end of the line on the side of that end.

In this way, the processing is executed for a line, and then, the next line is processed. The irradiation region (A+2D) and lighting OFF regions "C1" and "C2" are updated in accordance with the change in original width, and lighting control of the light source unit 33 is executed in accordance with the original width.

In the examples shown in FIGS. 13 and 14, the original existing region changes at only one end. Even when the region changes at two ends of the original, lighting control of the light source unit 33 can be executed in accordance with the change in width at each end by executing the same processing as described above.

Figure 15:
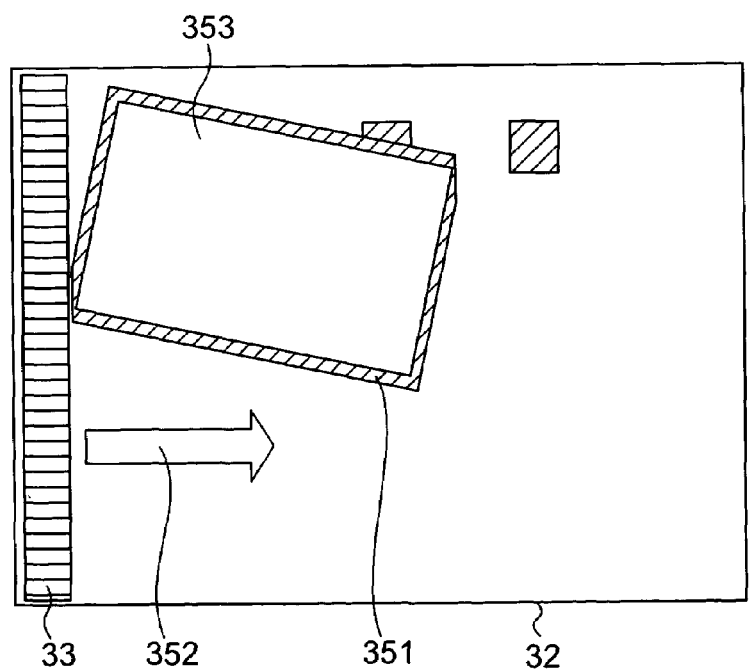
FIG. 15 is an explanatory view showing an example of the relationship between the original region and the lighting ON region in reading in the indefinite size mode.

FIG. 15 shows an example of a lighting ON region 351 of the light source unit 33 when an original is read in the indefinite size mode. An arrow 352 in FIG. 15 indicates the sub-scanning direction in which the light source unit 33 moves. In the main scanning direction, the lighting ON region 351 projects from the edges of an original 353 always by a predetermined width (the size of the margin region). That is, without depending on the manner the original is placed on the platen original table 32, only a region which almost coincides with the original existing portion is irradiated with light in accordance with the shape of the original. Exposure scanning is ended at the trailing edge of the original.

The embodiment of the present invention has been described above with reference to the accompanying drawings. The detailed arrangement is not limited to the illustrated embodiment, and changes and modifications not departing from the spirit and scope of the present invention are also incorporated in the present invention.

For example, in the embodiment, an original is placed on the platen original table 32 and read in the stationary scanning mode in which the reading sensor is moved with respect to the original. In reading, it is only necessary to relatively move the original and reading sensor. The present invention can also be applied to the flow scanning mode in which an original is read while moving it by the automatic document feeder 20.

In the flow scanning mode, the size of an original having a standard size is detected by the original sensor 28 and original edge sensor 29 arranged in the automatic document feeder 20. For example, the original sensor 28 detects the original width on the basis of the position of the regulation plate which moves in accordance with the original width. In addition, the original edge sensor 29 arranged in the conveyance path detects the trailing edge of the original during the reading operation. On the basis of this detection, the end timing of the reading operation is set.

When an indefinite-sized original is to be read in the flow scanning mode, for example, the leading edge of the original is detected by the original edge sensor 29 arranged in the conveyance path. On the basis of this detection, the start timing of the reading operation is set. For the first line at the start of reading, the light source unit 33 is wholly turned on. For the next and subsequent lines, the original existing region is identified on the basis of the read image data, and the lighting OFF regions and irradiation region are dynamically changed. The end timing of the reading operation can be determined either when all the pixels of the image data are black or on the basis of the timing at which the original edge sensor 29 detects the trailing edge of the original.

The dynamic change operation of the light source unit lighting state in the indefinite size mode described in the above embodiment can also be applied to a handy scanner.

In addition, when an original placed on the platen original table 32 is to be read, the platen cover is open may be detected. In this case, if the platen cover is closed, the original is read while wholly turning on the light source unit 33. Only when the platen cover is open, the irradiation region is controlled. For example, when existing region identification processing or irradiation region control processing in the indefinite size mode is executed by the CPU, the processing load is reduced when the platen cover is closed. Accordingly a high-speed reading operation can be executed.

In the above embodiment, a digital copying machine has been exemplified. However, the image reading apparatus of the present invention may be a single apparatus or be incorporated in another apparatus such as a facsimile apparatus.

What is claimed is:

1. An image reading apparatus comprising:
   a light source unit which comprises a plurality of light sources in a main scanning direction of an original and irradiates the original;
   a reader which reads the original in a sub-scanning direction based on irradiation by said light source unit and outputs reading information;
   an original region identifier which determines, in one line of the original, at least one area of black data extending from a corresponding at least one end of the original in the main scanning direction as an original non-existing region and a remaining region outside of the area as the original existing region; and
   a lighting control unit which, when a subsequent line is to be read by said reader, determines a part within the original non-existing region adjacent to the original existing region as a margin region, and which executes lighting control of the light sources to turn off light sources corresponding to a region of the original non-existing region except for the margin region and to turn on light sources corresponding to the original existing region and the margin region,
   wherein said lighting control unit executes said lighting control, when one of the end portions of a newly obtained existing region does not spread to the entire preceding margin region on the side of that end portion, to determine new margin regions on both sides to be a predetermined width within the original non-existing regions, and
   wherein said lighting control unit executes said lighting control, when one of the end portions of a newly obtained existing region spreads to the entire preceding margin region on the side of that end portion, to determine new margin regions on both sides as the entire original non-existing regions.

2. An apparatus according claim 1, wherein said original region identifier repeatedly identifies the original existing region based on the reading information repeatedly output from said reader, and said lighting control unit repeatedly executes the lighting control for of the light sources.

3. An apparatus according claim 1, wherein the predetermined width is set in a nonvolatile memory in advance.

4. An apparatus according claim 1, further comprising:
an original setting table on which the original is placed,
a cover member which covers the original setting table, and
determination means for determining whether said cover member is open,
wherein when said determination means determines that said cover member is open, said lighting control unit executes the lighting control to respectively turn on and off the light sources corresponding to the original existing and non-existing regions identified by said original region identifier 5. An apparatus according claim 1, wherein each of the light sources comprises a white LED.

6. An apparatus according claim 1, further comprising:
an original setting table on which the original is placed,
a cover member which covers the original setting table, and
a determination unit which determines whether said cover member is open,
wherein when said determination unit determines that said cover member is open, said lighting control unit executes the lighting control to respectively turn on and off the light sources corresponding to the original existing and non-existing regions identified by said original region identifier.

7. An image reading method in an image reading apparatus including a plurality of light sources in a main scanning direction of an original, said method comprising:
reading each line of the original in a sub-scanning direction by irradiation of light from the light sources;
outputting reading information corresponding to the read original;
determining, in one line of the original, at least one area of black data extending from a corresponding at least one end of the original in the main scanning direction as an original non-existing region and a remaining region outside of the area as the original existing region;
determining, for a subsequent line, a part within the original non-existing region adjacent to the original existing region as a margin region,
controlling, for the subsequent line, the light sources to turn off light sources corresponding to a region of the original non-existing region except for the margin region and to turn on light sources corresponding to the original existing region and the margin region,
wherein the controlling comprises:
determining new margin regions on both sides to be a predetermined width within the original non-existing regions when one of the end portions of a newly obtained existing region does not spread to the entire preceding margin region on the side of that end portion, and
determining new margin regions on both sides to be the entire original non-existing regions when one of the end portions of a newly obtained existing region spreads to the entire preceding margin region on the side of that end portion.

8. The method of claim 7, wherein said identifying and controlling steps are repeatedly performed, for a plurality of said lines.

* * * * *